United States Patent Office 3,553,596
Patented Jan. 5, 1971

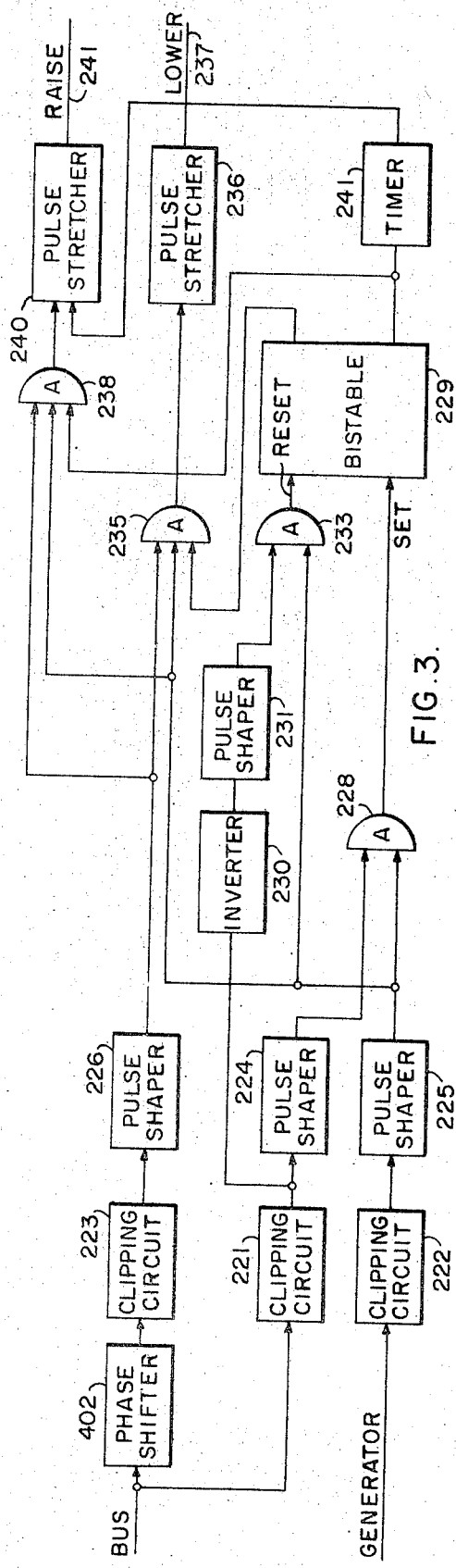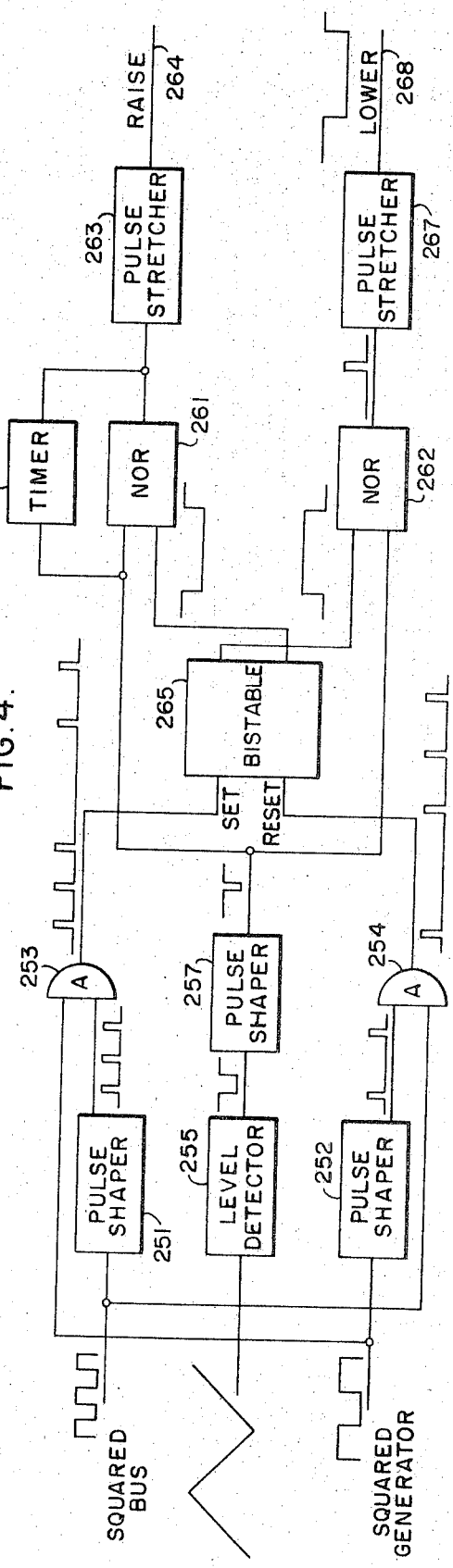

3,553,596
GENERATOR SPEED MATCHER USING DIRECT SAMPLING
Francis T. Thompson, Murrysville, and Tibor Rubner, Pittsburgh, Pa., assignors to Westinghouse Electric Corporation, Pittsburgh, Pa., a corporation of Pennsylvania
Filed Jan. 2, 1968, Ser. No. 695,021
Int. C. H03b 3/04
U.S. Cl. 328—155                    19 Claims

ABSTRACT OF THE DISCLOSURE

Squared bus and squared generator voltages are applied to two AND gates respectively. Bus and generator sampling pulses are produced whenever the square waves undergo a positive to zero transition, the bus sampling pulses being applied to the AND gate which has the generator square wave applied thereto and the generator sampling pulses being applied to the AND gate which has the bus square wave applied thereto, so that the bus samples the generator and the generator samples the bus or energized line. When the generator voltage is lagging the bus voltage, the output of one AND gate is a series of positive pulses while the output of the other AND gate remains at ground level. If the generator voltage is leading the bus voltage, the output of the other AND gate is a series of positive pulses while the output of the first named AND gate remains at ground. The outputs of the two AND gates are fed to opposite inputs of a bistable circuit. Setting and resetting of the bistable are accomplished by the first positive pulses from the respective AND gates. A phase difference waveform is fed to a level detector and a pulse shaper or generator which produces a sampling pulse when the phase difference between the bus and the generator is 50°. This last named pulse is used in two NOR circuits to sample both outputs of the bistable. If the bistable is in the set state when this sampling pulse occurs the output of a first NOR gate is a logical one and a "raise" pulse stretcher is actuated for producing a signal which is utilized to increase speed. If the bistable is in the reset state when the 50° sampling pulse occurs the output of a second NOR gate is a logical one, and a "lower" pulse stretcher will be actuated, and a signal produced to reduce the speed of the generator. If the bus and generator are too closely matched and the time interval between two successive 50° phase difference points is too long the "raise" pulse producer is actuated.

In another embodiment, squared generator and bus waveforms plus a third squared waveform representing the bus after phase shifting are obtained, and applied to four AND circuits which together with a bistable circuit and pulse stretchers provide "raise" and "lower" pulses or chains of pulses depending on the relationships of the generator and bus frequencies and phase.

CROSS REFERENCE TO RELATED APPLICATIONS

This application is related to the copending application of Tibor Rubner et al. for "Automatic Generator Synchronizing and Connecting System and Synchronizer Apparatus for Use Therein," Ser. No. 695,684, filed Jan. 4, 1968 and assigned to the assignee of this invention. In that copending application there is shown a complete automatic generator synchronizing system for ascertaining generator and bus conditions, creating generator conditions which permit the generator to be connected to the bus, and automatically connecting the generator at the right moment. This application is directed to a speed matcher which may be employed as a basic unit in the complete system.

This application is also related to the copending application of Tibor Rubner for "Voltage Acceptor Circuit and Overvoltage-Undervoltage Detector for Use Therein," Ser. No. 695,020, filed Jan. 2, 1968, and assigned to the assignee of this invention, the overvoltage-undervoltage detector of the last-named copending patent application also being suitable to be employed in the complete automatic synchronizing system. An additional related application is one by T. Rubner et al., for "Solid State Voltage Matcher and Voltage Difference Detector for Use Therein," SN 695,026, filed Jan. 2, 1968.

FIELD OF THE INVENTION

Before a generator can be connected to an energized power line, hereinafter called the "bus," the speed and voltage phase of the generator to be connected must be matched with those of the generator already supplying the bus. This invention relates to a speed matcher which compares the frequencies of the generator and the bus and provides "raise" and "lower" signals to the prime mover of the generator as needed to bring the generator frequency near the bus or power line frequency.

DESCRIPTION OF THE PRIOR ART

Several methods are presently employed for matching generator speeds. Some methods use mechanical means (motors, directional elements, etc.); some use frequency-to-voltage converters, and others use the well known "90° phase shift" principle. The mechanical speed matchers have obvious disadvantages and are complicated and expensive. The degree of speed matching which can be obtained by frequency-to-voltage converters is limited, unless expensive and complicated circuitry is used. For example, the prior art "90° phase shift" method requires two beat frequency waveforms, one obtained by direct addition or subtraction of the bus and generator voltages, and another obtained by addition or subtraction of the bus voltage and the generator voltage shifted by 90° (or the generator voltage and the bus voltage shifted by 90°). The resulting beat frequency waveforms are compared for relative phase shift. From the direction of the phase shift (leading or lagging, with either the bus or the generator phase as a reference), it is possible to deduce whether the generator is slower or faster than the bus. Apparatus utilizing this principle involves the use of long time constant filters and extensive circuitry.

SUMMARY OF THE INVENTION

Squared bus and squared generator voltages after pulse shaping are applied to two AND gates so that the bus samples the generator and the generator samples the bus. The outputs of the two AND gates are fed to opposite inputs a bi-stable or flip-flop. When the generator voltage is lagging the bus voltage, the output of one AND gate is a series of positive pulses while the output of the other AND gate remains at ground level. The flip-flop will be set by the first of these positive pulses. When the generator voltage is leading the bus voltage, the output of the other AND gate will be a series of positive pulses while the output of the first named AND gate remains at ground. The first of the last-named group of positive pulses will reset the flip-flop. A phase difference waveform is fed to a level detector and pulse shaper which produces a sampling pulse when the phase difference between the bus and the generator is 50°. This last-named pulse samples both outputs of the flip-flop; if the flip-flop is in the set state when this sampling pulse occurs the output at one NOR gate is a logical one and the "raise" pulser is actuated. If the flip-flop is in the reset state when the 50° sampling pulse occurs the output of a second NOR gate is a logical one and the "lower" pulser will be actuated. The "raise" pulser is actuated if the bus and generator are too closely matched, and therefore the time interval between two successive 50° phase difference points is too long.

In another embodiment three square wave signals are obtained, representing the generator, the bus, and the bus after phase shifting. These signals after shaping are applied to four AND circuits which together with a bistable circuit and pulse stretchers produce "raise" and "lower" pulses in accordance with relative bus and generator frequencies.

BRIEF DESCRIPTION OF THE DRAWINGS

FIG. 3 is a block diagram of apparatus according to one embodiment of our invention;

FIG. 4 is a block diagram of apparatus according to the preferred embodiment of our invention.

DESCRIPTION OF THE PREFERRED EMBODIMENTS

Figure 5:
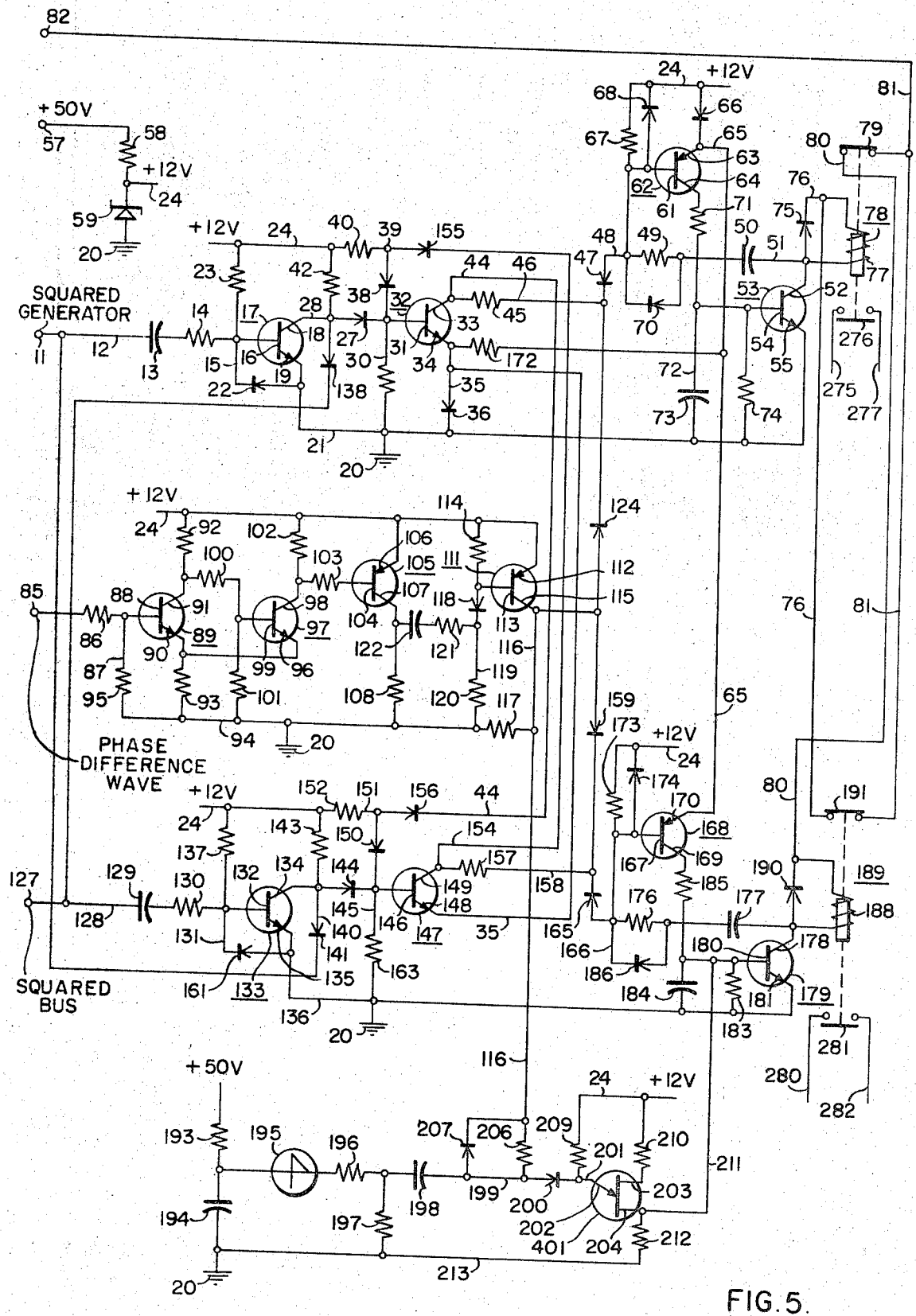
FIG. 5 is a schematic circuit diagram of the embodiment of FIG. 4.

Particular reference is made to FIG. 5, a schematic circuit diagram of the preferred embodiment. Input terminal 11, to which a squared generator voltage with respect to ground is applied, is connected by way of lead 12, capacitor 13, resistor 14 and lead 15 to the base 16 of a transistor generally designated 17 having a collector 18 and emittter 19. Emitter 19 is directly connected by way of lead 21 to ground 20, and is further connected by way of diode 22 to base 16. Base 16 and lead 15 are further connected by way of resistor 23 to power input lead 24 which may be at a positive potential of 12 volts with respect to ground. Collector 18 is connected by way of lead 28, diode 27 and lead 30 to the base 31 of an additional transistor generally designated 32 having a collector 33 and an emitter 34 connected by way of lead 35 and diode 36 to the aforementioned lead 21. Base 31 and lead 30 are connected by way of diode 38, lead 39 and resistor 40 to the aforementioned power input lead 24. Lead 28 and collector 18 are connected by way of resistor 42 to the aforementioned power input lead 24.

The aforementioned collector 33 of transistor 32 is connected by way of lead 44, resistor 45, lead 46, diode 47, lead 48, resistor 49, capacitor 50 and lead 51 to the collector 52 of a still further transistor generally designated 53 having a base 54 and emitter 55.

The aforementioned lead 24 energized at 12 volts with respect to ground may have the voltage supplied thereto after voltage dropping from an input terminal 57 at +50 volts with respect to ground, terminal 57 being connected by way of resistor 58 and Zener diode 59 to ground, lead 24 being connected to the junction between resistor 58 and Zener diode 59.

The aforementioned lead 48 is further connected to the base 61 of an additional transistor generally designated 62 having an emitter 63 and a collector 64, emitter 63 being connected by way of lead 65 and diode 66 to the aforementioned 12 volt line 24, lead 48 and base 61 being connected by way of resistor 67 to lead 24, and base 61 also being connected by way of diode 68 to power lead 24.

The aforementioned resistor 49 has diode 70 connected thereacross.

The aforementioned collector 64 of transistor 62 is connected by way of resistor 71, lead 72 and capacitor 73 to the aforementioned lead 21 and thence to ground. Lead 72 is connected to the aforementioned base 54 of transistor 53; the base 54 and lead 72 are also connected by way of resistor 74 to the lead 21. Lead 51 is connected by way of diode 75 to lead 76, and lead 76 is also connected to one winding terminal of a winding 77 of a relay generally designated 78, the other end or terminal of the winding 77 being connected to the aforementioned lead 51 and collector 52. The circuit through armature 79 is normally closd. When winding 77 is deenergized, connection is made between the relay contacts by armature 79, the contacts having connected thereto leads 80 and 81 respectively, lead 81 being connected to a terminal 82, which is connected by way of relay contacts on the synchronizer to the +50 volt supply, to disable the speed matcher after the generator has been connected to the bus.

Relay 78 has an additional armature 276 which closes a circuit between leads 275 and 277 when the relay winding is energized. Leads 275 and 277 are operatively connected to apparatus which changes the speed of the generator.

As previously stated one of the inputs to the generator speed matcher is a phase difference signal. This signal may be obtained from the converter-synchronizer shown in the aforementioned copending patent application directed to the entire synchronizer system. It is developed with respect to ground and applied to input terminal 85 which is connected by way of resistor 86 and lead 87 to the base 88 of a further transistor generally designated 89 having emitter 90 and collector 91. Collector 91 is connected by way of resistor 92 to the aforementioned 12 volt power lead 24, whereas emitter 90 is connected by way of resistor 93 to lead 94 and ground 20. Emitter 90 is directly connected to the emitter 96 of a further transistor generally designated 97, having a collector 98 and base 99, said base 99 being connected by way of resistor 100 to the collector 91 of transistor 89, said base 99 also being connected by way of resistor 101 to the aforementioned lead 94. The aforementioned collector 98 is connected by way of resistor 102 to 12 volt supply lead 24, and is further connected by resistor 103 to the base 104 of an additional transistor generally designated 105 having an emitter 106 directly connected to lead 24 and a collector 107 connected by way of resistor 108 to the aforementioned lead 94. An additional transistor generally designated 111 is shown having the emitter 112 thereof directly connected to lead 24, having the base 113 thereof connected by way of resistor 114 to lead 24 and having the collector 115 thereof connected by way of lead 116 and resistor 117 to lead 94. The aforementioned base 113 of transistor 111 is also connected by way of diode 118, lead 119 and resistor 120 to lead 94. Lead 119 is connected by way of resistor 121 and capacitor 122 to the collector 107 of transistor 105.

It is seen that the aforementioned lead 116 connected to collector 115 of transistor 111 is connected by way of diode 124 to the aforementioned lead 46 of the squared generator wave circuit.

As aforementioned, a squared bus voltage is obtained with respect to ground and this last-named voltage is applied to input terminal 127 and by way of lead 128, capacitor 129, resistor 130 and lead 131 to the base 132 of a transistor generally designated 133 having a collector 134 and an emitter 135 directly connected to lead 136 and ground 20. Base 132 and lead 131 are connected by way of resistor 137 to +12 volt lead 24.

It is seen that input terminal 127 and lead 128 are connected by way of diode 138 to the collector 18 of transistor 17 in the squared generator wave circuit. It is further seen that the collector 134 of transistor 133 is connected by way of lead 140 and diode 141 to the aforementioned lead 12 which is connected to input terminal 11 of the squared generator wave circuit. Collector 134 and lead 140 are further connected by way of resistor 143 to 12 volt supply lead 24, and lead 140 and collector 134 are connected by way of diode 144 and lead 145 to the base 146 of a transistor generally designated 147 having emitter 148 and collector 149. Collector 149 is connected by way of lead 154 and diode 155 to lead 39 in the squared generator wave circuit. The aforementioned lead 151 is connected by way of diode 156 to the aforementioned lead 44 which is connected to the collector 33 of transistor 32. The aforementioned emitter 148 of transistor 147 is connected to the aforementioned lead 35 in the square generator wave circuit. Collector 149 of transistor 147 is connected by way of resistor 157, lead 158 and diode 159 to the forementioned lead 116; lead 116 is also connected to diode 124 and is connected to collector 115.

Base 132 of transistor 133 is connected to emitter 135 thereof by diode 161. Base 146 of transistor 147 is connected by way of the aforementioned lead 145 and resistor 163 to lead 136.

The aforementioned lead 158 is connected by way of diode 165 and lead 166 to the base 167 of a further transistor generally designated 168 having a collector 169 and having the emitter 170 thereof directly connected by the aforementioned lead 65 to the emitter 63 of transistor 62, said lead 65 being further connected by way of resistor 172 to the emitter 34 of transistor 32. Base 167 is connected by way of resistor 173 to 12 volt lead 24, resistor 173 having diode 174 connected in parallel therewith.

The aforementioned lead 166 connects base 167 by way of resistor 176 and capacitor 177 to the collector 178 of a further transistor generally designated 179 having a base 180 and emitter 181. Emitter 181 is directly connected to lead 136 and ground 20. Base 180 is connected by way of resistor 183 to lead 136, resistor 183 having capacitor 184 connected thereacross, base 180 being further connected by way of resistor 185 to the collector 169 of transistor 168. The aforementioned resistor 176 has diode 186 connected thereacross. The aforementioned collector 178 is directly connected to one terminal of the winding 188 of a relay generally designated 189, and collector 178 is connected by way of diode 190 to lead 80, lead 80 being connected to the other terminal of winding 188 of relay 189. The circuit through armature 191 is normally closed. Armature 191 of relay 189, when winding 188 is deenergized, closes the circuit between lead 76 and lead 81.

Relay 189 has an additional armature 281 which while the relay is energized, closes a circuit through leads 280 and 282. Leads 280 and 282 go to apparatus for changing the speed of the generator in an opposite sense to the change produced by armature 276.

The aforementioned +50 volt input terminal 57 is connected by way of resistor 193 and capacitor 194 to ground. The junction between resistor 193 and capacitor 194 is connected by way of Shockley diode 195, resistor 196 and resistor 197 to ground. The junction between resistor 196 and resistor 197 is further connected by way of capacitor 198, lead 199, diode 200 and lead 201 to the emitter 202 of a unijunction transistor 401 having bases 203 and 204. The aforementioned lead 199 is connected by way of resistor 206 to the aforementioned lead 116 and to the collector 115 of transistor 111. Resistor 206 has diode 207 ocnnected in shunt therewith. Lead 201 is connected by way of resistor 209 to +12 volt lead 24. Aforementioned base 203 is connected by way of resistor 210 to +12 volt lead 24. Base 204 is connected by way of lead 211 to the base 180 of the aforementioned transistor 179. Base 204 and lead 211 are further connected by way of resistor 212 and lead 213 to ground 20.

Figure 1A:
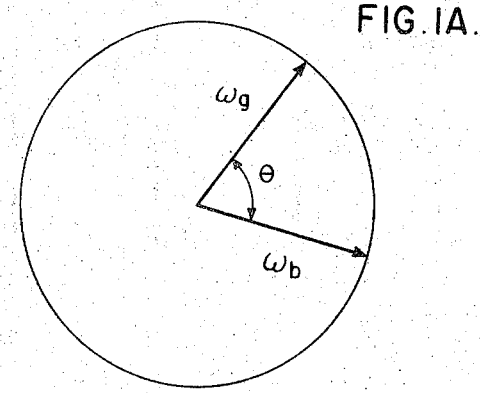
FIGS. 1A and 1B illustrate certain phase relationships between bus and generator voltages under certain conditions.
Figure 1B:
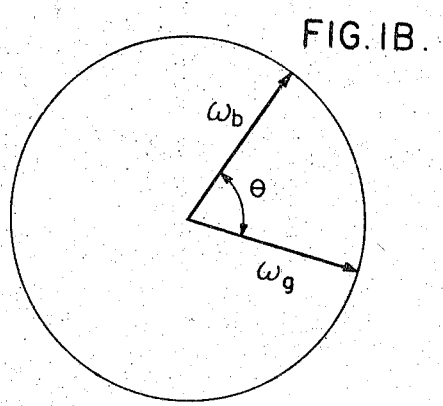

Particular reference is made now to FIGS. 1A and 1B, illustrating phase relationships between generator and bus voltages. FIG. 1A illustrates a relationship existing at a time shortly after the occurrence of phase coincidence. During this time θ has increased from 0° to a value less than 180°. If the generator is faster it has a leading phase with respect to the bus, and if it is slower it has a lagging phase as illustrated in FIG. 1B. At a time shortly after 180° phase difference has occurred but before phase coincidence, the relative phase condition between bus and generator voltages is reversed. If the generator is faster, it lags behind the bus, and if it is slower, it leads the bus. It is possible therefore to ascertain whether a generator is slower or faster than the bus by ascertaining which of the voltages leads the other at any time other than the time of 0° or 180° phase difference. It is necessary to know whether the sampling takes place following a coincidence in phase or following a 180° difference in phase.

Figure 2:
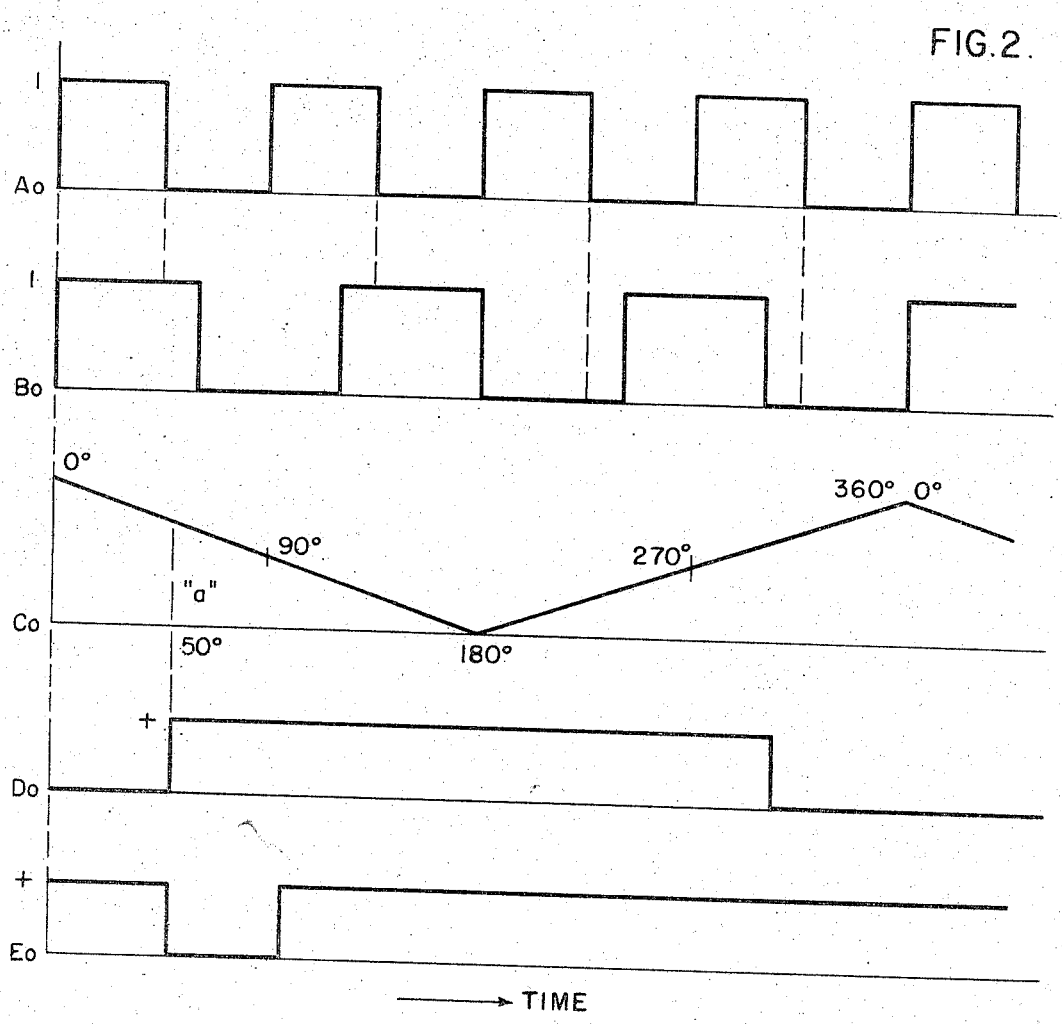
FIG. 2 is a group of curves illustrating the operation of the apparatus.

As previously stated we square the generator waveform and square a voltage corresponding to the bus voltage. In one embodiment, these square waves are available and need not be produced. Curves A and B of FIG. 2 illustrate two square waves of difference frequencies. In the sampling process a positive voltage corresponds to a logical one and ground potential corresponds to a logical zero. It can be seen that a one to zero transition of the square wave of the higher frequency occurs at a time when the square wave of lower frequency is a logical one, provided that the phase difference occurs after phase coincidence between the two square waves and before the phase difference reaches 180°. If the transition occurs after a 180° phase difference and before coincidence is reached, a one to zero transistion of the higher frequency square wave corresponds in time to a logical zero of the lower frequency square wave. Thus by having the generator sample the bus/or the bus sample the generator at any phase difference (as long as it is known whether the sampling takes place following a phase coincidence or a 180° difference in phase) it is possible to find whether the generator is slower or faster than the line.

As will be seen more clearly from the aforementioned copending application of Rubner, Wavre and Bednarek, S.N. 695,684 both the squared bus and squared generator voltages as well as a phase difference waveform are available from the synchronizer unit described and claimed in said last-named copending patent application.

In the embodiment of our invention shown in schematic in FIG. 5 and in clock form in FIG. 4, we produce or provide a signal obtained at a definite phase difference (that is, 50°) by detecting when the phase difference voltage crosses a fixed voltage level (corresponding to 50°) while changing in the negative direction as shown in Curves C and D, FIG. 2. The squared bus input may be applied to the pulse shaper shown in block form at 251, and which may include the portion of the schematic diagram of FIG. 5 including capacitor 129, resistor 130, transistor 133, diode 161 and resistor 137. The squared generator voltage may be applied to pulse shaper 252 which may include in FIG. 5 the capacitor 13, resistor 14, transistor 17, diode 22 and resistor 23. Pulse shapers 251 and 252 produce output pulses or sampling pulses whenever the square waves applied thereto undergo transitions from one to zero, that is, from positive to zero. The AND circuit shown at block 253 may include the portion of the schematic including resistor 143 and diode 141. It is seen that the squared generator input is directly applied to the AND circuit 253 which has the output of the pulse shaper 251 applied thereto, the square wave generator signal being applied through diode 141, FIG. 5. AND circuit 253 produces an output only when both inputs are applied thereto simultaneously. AND circuit 254 has the output of pulse shaper 252 applied thereto, and is also connected to receive an input corresponding to the squared bus waveform, this being applied by way of diode 138, FIG. 5. AND circuit 254 produces an output only when both inputs are applied thereto simultaneously.

The level detector shown in block 255 has a phase difference wave similar to the waveform of graph C of FIG. 2 applied thereto. The level detector may include transistors 89, 97 and 105 of FIG. 5 and associated components. The output of the level detector, which may be a substantially square wave, is applied to a pulse shaper shown in block at 257, which pulse shaper 257 may include resistor 108, capacitor 122, resistor 121, resistor 120, resistor 117, diode 118, resistor 114 and transistor 111 of the schematic of FIG. 5. Pulse shaper 257 produces an output pulse of sampling pulse whenever there is a zero to one transistion of the square wave applied thereto from level detector 255. It is seen that the output of the pulse shaper 257 is applied to two NOR circuits, these being shown in blocks 261 and 262, and in FIG. 5 the output of the last-named pulse shaper is applied by way of lead 116 and diodes 124 and 159 to the NOR circuits.

One NOR circuit may include in the schematic diagram of FIG. 5, resistor 45, diodes 47 and 70, resistors 49, 71, 67 and 74, diodes 66, 68 and 124 and transistor 62.

The other NOR circuit may include resistor 157, diodes 165, 186, 174 and 159, resistors 173, 176, 185 and 183 and transistor 168.

Diode 66 is common to both NOR circuits and serves to improve noise immunity of the NOR circuits. Diodes 68 and 174 protect the base-emitter junctions of the transistors from the voltage transients that appear across capaciors 50 and 177 respectively during operation.

The bistable or flip-flop circuit indicated by the block 265 may include the two transistors generally designated 32 and 147 and associated circuitry.

The outputs of AND circuits 253 and 254 are applied to the bistable circuit 265, the output of AND circuit 253 setting the bistable to a first stable state, the output of AND circuit 254 resetting the bistable to a second stable state. The second input to NOR circuit 261 is supplied by bistable circuit 265 while in a reset state. The second input to NOR circuit 262 is supplied by bistable circuit 265 while in a set condition.

It is understood that NOR circuit 261 can supply an output only while bistable 265 is set, and NOR circuit 262 can supply an output only while bistable 265 is reset.

Pulse stretchers shown at blocks 263 and 267 stretch the outputs of NOR circuits 261 and 262, respectively, producing "raise" and "lower" pulses on leads 264 and 268 respectively.

The pulse on lead 264 may be applied to relay winding 188, FIG. 5 and the pulse on lead 268 may be applied to relay winding 77, FIG. 5.

The "raise" and "lower" pulses may be 170 milliseconds in duration, and it is understood that a pulse may be produced or formed once every beat cycle until the generator is raised or lowered a necessary amount.

The function of the timer 270 is to sense when the frequency difference between generator and bus is too small by measuring the time interval between successive outputs of pulse shaper 257. If the frequency difference is too small it may take a long time before the bus and generator voltages go through phase coincidence. Correspondingly it may take a long time before the generator can be connected to the bus. This possibly long waiting period is avoided by giving an unneeded raise pulse. This is done by the timer 270 which may include unijunction transistor 401 of FIG. 5 and its associated components. By way of further summary of the apparatus of the blocks diagram of FIG. 4, the embodiment utilizes a phase difference waveform obtained by a logical combination of the waveforms of curves A and B, and which phase difference waveform signal is obtainable as an output of the aforementioned synchronizer of the aforementioned copending patent application, the phase difference waveform having the shape illustrated in curve C, FIG. 2. In this case, a signal is obtained at a definite phase difference, that is 50°, this 50° point being designated by the dashed line $a$ in curve C of FIG. 2, by detecting when the phase difference voltage crosses a fixed voltage level (corresponding to 50°) while changing in the negative direction as shown in FIG. 2. In FIG. 4, the squared bus and squared generator input signals supplied by the converter of the aforementioned copending application go to pulse shapers 251 and 252. These produce sampling pulses which are applied to AND circuits 253 and 254 respectively, and when the sampling pulse from pulse shaper 251 coincides with a positive voltage of the squared generator input, AND circuit 253 produces an output which is applied to the bistable circuit 265 to set the bistable circuit. In like manner, the squared bus input waveform and the generator sampling pulse from pulse shaper 252 are applied to AND circuit 254 and when they coincide they are applied to the bistable circuit 265 to reset the same. When the bistable is in the "set" condition, a "signal" at ground level is applied therefrom to NOR circuit 261, and when the bistable is in "reset" position a "signal" at ground level is applied therefrom to NOR circuit 262. The other input to NOR circuit 261 is the shaped pulse, which is at ground level, from pulse shaper 257 having a signal applied thereto from level detector 25 which has the aforementioned phase difference signal applied thereto. This same last-named pulse output from pulse shaper 257, a shaped pulse at ground level, is also applied to a NOR circuit 262 which as aforementioned has a signal at ground level applied thereto, to constitute the other input, from the bistable circuit 265 while in a "reset" condition.

When both signals are at ground level at the input of NOR circuit 261, the NOR circuit 261 produces an output which is stretched by pulse stretcher 263 and a "raise" pulse is produced on lead 264. When there is no input of either of the two possible inputs to NOR circuit 262, an output is produced therefrom which is pulse stretched by pulse stretcher 267 and a "lower" pulse is produced on lead 268.

Particular reference is made now to the block diagram of FIG. 3 which shows another embodiment of our invention in block form. The bus, generator and phase shifted bus voltage waveforms are squared by clipping circuits, these clipping circuits being shown at 221, 222 and 223, respectively. The squared waveforms are fed to pulse shapers 224, 225 and 226 respectively, these also being in block form, which produce sampling pulses whenever a one to zero transition of the square wave occurs, that is, a transition from positive to zero. At phase coincidence, the bus and generator sampling pulses coincide, are passed by the AND circuit shown in block form at 228 and produce a signal output from the AND circuit which is applied to a bistable or flip-flop circuit shown in block form at 229, setting the bistable circuit to one stable state. The squared bus voltage is inverted by the inverter shown in block form at 230 and fed to a pulse shaper shown in block form at 231, the output of which is fed to an additional AND circuit shown at block 233; the other input to AND circuit 233 is the shaped sampling pulse obtained by clipping the generator voltage. When the generator and bus voltages are 180° out of phase, the inverted bus sampling pulse coincides with the generator sampling pulse and these are applied simultaneously to AND circuit 233 which produces an output which resets the bistable circuit 229 to a second stable state.

A still further AND circuit is shown in block 235, having as inputs thereto one output of the bistable circuit 229 while the bistable is in reset condition, the generator sampling pulse obtained from pulse shaper 225, and the phase shifted line sampling pulse obtained from pulse shaper 226. When all of these inputs are simultaneously present at the input of the AND circuit 235, an output is obtained therefrom and applied to a pulse stretcher shown in block form at 236, which produces a "lower" speed pulse on lead 237. This "lower" pulse is produced, then, if coincidence of the phase shifted line sampling pulse and the generator sampling pulse occurs while the bistable circuit 229 is reset (that is, during the period of 180°–0° phase difference); the generator is fast, and accordingly the aforementioned "lower" pulse is given.

A fourth AND circuit is shown in block form at 238, and is seen to have three inputs, one being a signal when bistable circuit 229 is "set," another being a sampling pulse produced from the generator voltage, and the third being a sampling pulse obtained from the phase shifted bus voltage. If coincidence of the phase shifted bus sampling pulse and the generator sampling pulse occurs while the flip-flop is set (that is, during the period of 0°–180° phase difference), the generator is slow, AND circuit 238 provides an output to pulse stretcher 240 and a "raise" pulse output is provided on lead 242.

The function of the timer 241 is to sense when the frequency difference between generator and bus is too small by measuring the time interval between successive set pulses of the flip-flop. If the frequency difference is too small it may take a long time before the bus and generator voltages go through phase coincidence. Correspondingly it may take a long time before the generator can be connected to the bus. This possibly long waiting period is avoided by giving an unneeded raise pulse. This is done by the timer.

In the level detector of FIG. 5, transistors known in the trade are suitable for use therein; transistor 89 may be a 2N1711; transistor 97 may be a 2N1711 and transistor 105 may be a 2N3134. Resistor 86 may have a value of 15 kilohms, resistor 95 a value of 4.32K, resistor 93 a value of 15K, resistor 101 a value of 100K, resistor 103 a value of 47K, resistor 102 a value of 30.1K, resistor 100 a value of 15K, and resistor 92 a value of 12.1K.

The aforementioned device 195, FIG. 5, may be a Shockley diode, or any other suitable two-terminal device having characteristics similar to those of a four layer breakdown device.

In the claims appended hereto, the transition of a square wave from positive to zero may also be referred to as one to zero transition.

Whereas we have shown and described our invention with respect to two embodiments thereof which produce satisfactory results, it should be understood that the aforedescribed drawings and the foregoing written description are illustrative and exemplary only and should not be interpreted in a limiting sense.

We claim as our invention:

1. Electrical circuit apparatus for producing "raise" and "lower" signals for use in speed matching apparatus for matching the speed of an alternating current generator and the frequency of the voltage produced thereby with the frequency of the alternating current voltage on an energized bus to which the generator is to be connected comprising, in combination, first pulse obtaining means connected to the bus for producing a first series of sampling pulses at time intervals corresponding to the interval between successive similar voltage waveforms on the bus, second pulse obtaining means including phase shifting means for obtaining a second series of sampling pulses occurring at time intervals corresponding to successive similar voltage waveforms on the bus after phase shifting by a preselected amount, third pulse obtaining means operatively connected to the generator for obtaining a third series of sampling pulses at time intervals corresponding to successive similar voltage waveforms of the generator, first AND circuit means operatively connected to the first pulse obtaining means and to the third pulse obtaining means and having the bus and generator sampling pulses applied thereto, said first AND circuit means producing an output while the bus and generator sampling pulses coincide, bistable circuit means operatively connected to the first AND circuit means whereby the bistable circuit means is set to one stable state by an output from the first AND circuit means, inverter and pulse shaper means connected to the first pulse obtaining means for obtaining a fourth series of sampling pulses at inversions of the bus waveform opposite to the inversions thereof corresponding to pulses of the first series of sampling pulses, second AND circuit means having the fourth series of sampling pulses applied thereto as one input, circuit means operatively connecting the second AND circuit means to the third pulse obtaining means for applying the generator sampling pulses as an additional input to the second AND circuit means, said second AND circuit means being operatively connected to said bistable circuit and supplying a signal thereto when the two inputs to the second AND circuit means occur simultaneously to reset the bistable circuit, third AND circuit means operatively connected to the bistable circuit and having one input supplied thereto while the bistable circuit is in reset condition, said third AND circuit means having applied thereto as an additional input the phase shifted sampling pulses of the bus voltage, said third AND circuit means having applied thereto as a third input the sampling pulses produced by the generator voltage waveform, said third AND circuit means producing an output while the three inputs thereto occur simultaneously, said last-named output corresponding to said "lower" signal, fourth AND circuit means operatively connected to the bistable circuit and having one input supplied thereto while the bistable circuit is in set condition, said fourth AND circuit means having an additional input supplied thereto corresponding to the phase shifted sampling pulses of the bus voltage, said fourth AND circuit means having as a third input applied thereto the generator sampling pulses, said fourth AND circuit means producing an output while the three inputs are applied thereto simultaneously, said last-named output corresponding to said "raise" signal.

2. Apparatus according to claim 1 including in additional first pulse stretcher means operatively connected to said fourth AND circuit means to receive the output therefrom and produce a "raise" signal of longer duration, and second pulse stretcher means operatively connected to said third AND circuit means to receive the output therefrom and to produce a "lower" signal of longer duration.

3. Apparatus according to claim 2 including in addition timer means operatively connected to the first-named pulse stretcher means, to the bistable circuit and to the fourth AND circuit means for actuating the first pulse stretcher means if the bistable circuit does not chang state within a certain predetermined time.

4. Apparatus according to claim 1 wherein the first pulse obtaining means, the second pulse obtaining means, and the third pulse obtaining means include first, second and third clipping circuit means respectively each adapted to receive a substantially sinusoidal voltage waveform applied thereto and to produce a substantially square wave output.

5. Apparatus according to claim 4 including first, second and third pulse shaper means operatively connected to the three clipping circuit means to produce other pulses when the square waves undergo one to zero transitions.

6. Speed matcher apparatus comprising, in combination, first signal obtaining means adapted to be operatively connected to a bus, second signal obtaining means including phase shifting means adapted to be connected to the bus, third signal obtaining means adapted to be connected to a generator, bistable circuit means, first pulse producing means operatively connected to the bistable circuit means for producing a "raise" pulse while the bistable circuit means is in one stable state, second pulse producing means operatively connected to the bistable circuit for producing a "lower" pulse while the bistable circuit is in a second stable state, and a plurality of AND circuit means operatively connecting the bistable circuit and the first and second pulse producing means to the first, second and third signal obtaining means whereby the generator periodically samples the bus and the bus periodically samples the generator, said plurality of AND circuit means ascertaining whether the sampling takes place between a phase coincidence and a 180° difference in phase, or between a 180° difference in phase and a later phase coincidence of the voltages of the bus and generator, and supplying inputs to the first and second pulse producing means selectively to produce "raise" and "lower" pulses in accordance with the relative frequencies of the generator voltage and the voltage on the bus.

7. Speed matcher apparatus comprising, in combination, means adapted to be electrically connected to a bus for producing a first square wave signal of a first frequency, other means adapted to be electrically connected to a generator for producing a second square wave signal of a second frequency, logical circuit means including a bistable circuit and having the square wave of the first frequency applied thereto, said logical circuit means including means for ascertaining whether any particular transition of both the square wave of first frequency and the square wave of the second frequency takes place following a phase coincidence or a 180° difference in phase of the voltages of the bus and generator, and "raise" and "lower" signal generator means operatively connected to the logical circuit means for selectively producing "raise" and "lower" signals in accordance with the relative frequency between the generator and the bus.

8. Electrical circuit apparatus adapted to have first and second alternating current voltages, one of a first frequency and the other of a second different frequency applied thereto and to selectively produce a first output signal while the first frequency is greater than the second frequency, and to produce a second output signal while the second frequency is greater than the first frequency comprising, in combination, circuit means including first and second square wave generators having the first and second voltages applied thereto respectively for producing first and second square waves having frequencies corresponding to those of the voltages, a positive voltage corresponding to a logical one and ground potential corresponding to a logical zero, and logical circuit means including a bistable circuit for utilizing the transition of the first square wave between one and zero states and the transitions of the second square wave between one and zero states in either sense to provide the first output signal while the alternating current voltage of the first frequency has a frequency greater than that of the second alternating current voltage and to provide the second output signal while the frequency of the second alternating current voltage exceeds that of the first alternating current voltage.

9. In speed matching apparatus, in combination, first means adapted to be connected to an alternating current bus for obtaining pulses occurring at a frequency corresponding to the frequency of the alternating current voltage in the bus, second means adapted to be connected to a generator of alternating current for obtaining other pulses which occur at a frequency corresponding to the alternating current voltage of the generator, sampling circuit means operatively connected to the first and second pulse obtaining means, means adapted to be electrically connected to the bus for shifting the phase of only the alternating current voltage obtained therefrom, further pulse obtaining means connected to the phase shifting means for obtaining a series of phase shifted pulses of the frequency of the alternating current voltage in the bus, and means for applying said phase shifted pulses to the sampling circuit means, said sampling circuit means utilizing the phase shifted pulses to ascertain the relative frequency of the alternating current in the bus and the alternating current in the generator.

10. In an electrical circuit, in combination, first AND circuit means adapted to have applied thereto as one input a square wave having a frequency corresponding to an alternating current voltage of first frequency and as a second input a series of pulses having a repetition rate equal to the frequency of an alternating current voltage of second different frequency and to produce an output when a positive portion of the square wave coincides at the input thereof with one of the pulses, second AND circuit means adapted to have applied thereto as one input a square wave having a frequency corresponding to the alternating current voltage of second different frequency and as a second input a series of pulses having a repetition rate equal to the first frequency and to produce an output when a positive portion of a square wave coincides at the input thereof with one of the last-named pulses, a bistable circuit having two stable states operatively connected to the first AND circuit means and adapted to be set to a first stable state by a signal output from the first AND circuit means, said bistable circuit being operatively connected to the second AND circuit means and adapted to be reset to a second stable state when there is an output from the second AND circuit means, level detector means adapted to have applied thereto as an input a triangular waveform signal having at least one characteristic which varies in accordance with variations in the phase difference between the first alternating current voltage and the second alternating current voltage and to produce a substantially square wave output, pulse generator means having said last-named square wave applied thereto and producing a sampling pulse whenever the last named square wave undergoes a transition from zero to one, first NOR circuit means operatively connected to the pulse generator means to receive the sampling pulses as one input and operatively connected to the bistable circuit to receive an input from the bistable circuit while the bistable circuit is in reset condition, said first NOR circuit means producing an output when neither of said possible inputs thereto is present, second NOR circuit means operatively connected to the pulse generator means to receive the sampling pulses as one input and operatively connected to the bistable circuit and having an input applied thereto from the bistable circuit while the bistable circuit is in the set condition, said second NOR circuit means producing an output when neither of said possible inputs thereto is present.

11. Apparatus according to claim 10 including in addition circuit means having the first square wave applied thereto and generating the second series of pulses, and other circuit means having the second square wave applied thereto and generating the first series of pulses.

12. Apparatus according to claim 11 further characterized in that pulses of the second series are produced when the first square wave undergoes a one to zero transition, and the pulses of the first series are produced when the second square wave undergoes a one to zero transition.

13. Apparatus according to claim 10 including in addition first and second pulse stretcher means operatively connected to the first and second NOR circuit means to receive the outputs thereof and produce pulses of longer time duration.

14. Apparatus according to claim 13 including in addition timer means connected in parallel with the first NOR circuit means, to actuate said first pulse stretcher means when no sampling pulse is given by said pulse generator means within a predetermined time.

15. In combination, first and second means connected to an alternating current bus and generator for producing first and second squared waveforms, first and second pulse shaper means operatively connected to the first and second squared waveform producing means for producing sampling pulses whenever a one to zero transition of a squared wave occurs, means including an AND circuit having the sampling pulses applied thereto for producing a signal output when the sampling pulses of the first and second pulse shaping means are coincident representing phase coincidence of the alternating current of the bus and that of the generator, a bistable circuit connected to receive as one input the output of the AND circuit and to be set to a first stable state by a signal output of said AND circuit, means for obtaining an inverted squared waveform of one of the first and second squared waveforms, third pulse shaper means connected to the means for obtaining an inverted squared waveform and producing a third sampling pulse, an additional AND circuit having the third sampling pulse applied thereto as an input and the sampling pulse of that squared waveform which is not inverted applied thereto as another input and producing an output signal when the sampling pulses applied thereto are coincident representing 180 degrees phase difference between bus and generator alternating currents, a circuit means applying said last named output signal to said bistable circuit to reset the bistable circuit to a second stable state, further and still further AND circuit one having one signal input applied thereto while the bistable circuit is set and the other having one signal input applied thereto while the bistable circuit is reset, means for shifting the phase of an alternating current corresponding in frequency to one of the bus and generator frequencies a predetermined amount less than 180 degrees, means operatively connected to the phase shifting means for obtaining an additional squared waveform and producing additional sampling pulses, circuit means for applying the additional sampling pulses as an additional input to both the further AND circuit and the still further AND circuit, means for applying the sampling pulses of the second alternating current as inputs to the further AND circuit and the still further AND circuit, means for stretching the output of the further AND circuit to provide a signal for controlling generator speed in one sense, and means for stretching the output of the still further AND circuit to provide a signal for controlling generator speed in the opposite sense.

16. Circuit means adapted to have first and second alternating current voltages applied thereto which are to be brought into substantial phase and frequency synchronization and wherein before synchronization is attained the first voltage if higher in frequency than the second voltage leads the second voltage in phase during the time interval between phase coincidence and 180 degree phase difference and during the time interval between 180 degree phase difference and phase coincidence the first voltage of higher frequency lags the second voltage in phase, the first voltage if lower in frequency than the second voltage lagging the second voltage during the time interval between phase coincidence and 180 degree phase difference and leading the second voltage during the time interval between 180 degree phase difference and phase coincidence, other circuit means operatively connected to the first-named circuit means for producing a first signal at a time corresponding to phase coincidence and for producing a second signal at a time corresponding to 180 degrees phase difference, means for shifting the phase of one of the first and second alternating current voltages a predetermined amount to obtain a third phase shifted alternating current voltage, and further circuit means operatively connected to the phase shifting means and having the first phase coincidence signal and the second 180 degree phase difference signal applied thereto and utilizing the first and second signals and the third alternating current voltage to ascertain whether the frequency of the first alternating current voltage is greater or less than that of the second alternating current voltage, the further circuit means selectively producing one of two output signals in accordance with the relative frequencies, the last-named signal outputs being adapted for use in bringing the two alternating current voltages into phase and frequency synchronization.

17. In speed matching apparatus, in combination, first and second square wave generating means including clipping means adapted to have first and second alternating current voltages applied thereto and to produce square waves corresponding in frequency to the voltages, the square waves having substantially constant amplitudes irrespective of changes in the amplitudes of the voltages, a first AND circuit having the first and second square waves applied thereto as inputs and producing an output while the square waves are coincidentally applied thereto, means operatively connected to the first square wave generating means for obtaining an inverted square wave 180 degrees out of phase with the first square wave which is applied to the first AND circuit, a second AND circuit having the inverted square wave and the second square wave applied thereto as inputs and producing an output while both inputs are applied thereto coincidentally, a bistable circuit having the outputs of the first AND circuit and the second AND circuit applied thereto, the bistable circuit being set to one stable state by one input and reset to a second stable state by the other input, third and fourth AND circuits having outputs of the bistable circuit selectively applied thereto while the bistable circuit is in set and reset states, means for shifting the phase of the first voltage a predetermined amount, means operatively connected to the phase shifting means for obtaining an additional square wave, means for applying the second square wave and the additional square wave as inputs to the third AND circuit, and means for applying the additional square wave and the second square wave as inputs to the fourth AND circuit, the third and fourth AND circuits providing outputs adapted for selectively raising and lowering the frequency of the second alternating current voltage.

18. In combination, circuit means adapted to have a triangular waveform of uniform polarity representing the phase difference between first and second alternating current voltages applied thereto as an input, said triangular waveform varying linearly from a maximum value at zero degrees phase difference to zero value at 180 degree phase difference and thereafter increasing linearly to said maximum value at 360 degrees phase, the circuit means including means responsive to a change in the instant amplitude of the triangular waveform and producing a pulse when the amplitude of the triangular waveform corresponds to 50 degrees phase difference, said pulse continuing in duration until the instant amplitude of the triangular waveform passes through zero and thereafter attain the value it has at 360 degrees minus 50 degrees, pulse shaper means having the output of the circuit means applied thereto, first and second NOR circuits operatively connected to the pulse shaper means and both having the output of the pulse shaper means applied thereto as an input, first and second input leads adapted to have first and second squared waveforms corresponding to the first and second alternating current voltages applied thereto, a first AND circuit having the second squared waveform applied thereto as one input, a second AND circuit having the first squared waveform applied thereto as one input, first pulse shaper means connected to the first lead for generating sampling pulses and applying said sampling pulses to the first AND circuit as a second input, second pulse shaper means connected to the second lead for generating other sampling pulses and applying said other sampling pulses to the second AND circuit as a second input, and a bistable circuit connected to receive the outputs of the first and second AND circuits and being set to one stable state by the output of the first AND circuit and reset to another stable state by the output of he second AND circuit the bistable circuit while in one state supplying an input to the first NOR circuit and while in the other state supplying an input to the second NOR circuit, the NOR circuits selectively producing outputs suitable for use in increasing and decreasing the frequency of the second alternating current voltage with respect to said first alternating current voltage.

19. In speed matching apparatus, in combination, first and second input means, first AND circuit means adapted to have first and second pulsed signals from the input means applied thereto, the first pulsed signal having a repetition rate corresponding to the alternating current frequency of an energized bus, the second pulsed signal having a repetition rate corresponding to the alternating current frequency of a generator to be synchronized in frequency and phase with the frequency of the alternating current of the bus, second AND circuit means adapted to have the first and second pulsed signals applied thereto, a bistable circuit operatively connected to both the first and second AND circuit means and being set to a first state by the output of one AND circuit means and reset to a second state by the output of the second AND circuit means, and first and second logic circuitry operatively connected to the bistable circuit and to the first and second input means, the first logic circuitry producing an output only when the bistable circuit is in a set state, the second logic circuitry producing an output only when the bistable circuit is in a reset state, the outputs of the first and second logic circuitry being adapted to be formed into "Raise speed" and "Lower speed" control signals for increasing or decreasing the speed of the generator toward a synchronized condition.

References Cited

UNITED STATES PATENTS

| | | | |
|---|---|---|---|
| 3,200,340 | 8/1965 | Dunne | 328—155X |
| 3,235,800 | 2/1966 | Turrell | 328—134X |
| 3,328,688 | 6/1967 | Brooks | 328—133X |
| 3,430,148 | 2/1969 | Miki | 328—133 |

JOHN S. HEYMAN, Primary Examiner

U.S. Cl. X.R.

328—72, 133, 151